(12) United States Patent
Moon et al.

(10) Patent No.: US 7,849,481 B2
(45) Date of Patent: Dec. 7, 2010

(54) NOTIFICATION FOR INTERACTIVE CONTENT

(75) Inventors: Hannah Y. Moon, Boston, MA (US); D. Beau Morley, Somerville, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 348 days.

(21) Appl. No.: 11/693,528

(22) Filed: Mar. 29, 2007

(65) Prior Publication Data

US 2008/0244671 A1  Oct. 2, 2008

(51) Int. Cl.
  *G06F 3/00* (2006.01)
  *G06F 13/00* (2006.01)
  *H04N 5/445* (2006.01)

(52) U.S. Cl. .................. 725/45; 725/40; 725/41; 725/42; 725/43; 725/44; 725/46; 725/47; 725/51; 725/52; 725/61

(58) Field of Classification Search ............. 725/40–47, 725/51–52, 61
See application file for complete search history.

(56) References Cited

U.S. PATENT DOCUMENTS

| | | | | |
|---|---|---|---|---|
| 6,025,837 A * | 2/2000 | Matthews et al. | ........... | 715/721 |
| 6,057,872 A * | 5/2000 | Candelore | ........... | 725/23 |
| 6,240,555 B1* | 5/2001 | Shoff et al. | ........... | 725/110 |
| 6,324,694 B1* | 11/2001 | Watts et al. | ........... | 725/32 |
| 7,418,672 B2* | 8/2008 | Stautner et al. | ........... | 715/835 |
| 2001/0003212 A1* | 6/2001 | Marler et al. | ........... | 725/40 |
| 2002/0199195 A1* | 12/2002 | Townsend et al. | ........... | 725/60 |
| 2004/0003412 A1* | 1/2004 | Halbert | ........... | 725/112 |
| 2005/0015803 A1* | 1/2005 | Macrae et al. | ........... | 725/41 |
| 2005/0283800 A1* | 12/2005 | Ellis et al. | ........... | 725/40 |

OTHER PUBLICATIONS

"Digital on-screen graphic", Digital on-screen graphic—Wikipedia, the free encyclopedia, http://en.wikipedia.org/wiki/Digital_on-screen_graphic, printed Mar. 27, 2007, pp. 1-5.

* cited by examiner

*Primary Examiner*—Jason P Salce (57) ABSTRACT

A system may provide a video program or information associated with the video program on a video display device, and provide an interactive content icon on the video display device. The interactive content icon may indicate that interactive content is available for the video program.

23 Claims, 13 Drawing Sheets

| TAG FIELD | VIDEO PROGRAM/ADVERTISEMENT FIELD |
|---|---|
| TAG 1 | PROGRAM/ADVERTISEMENT ABC |
| TAG 1 | PROGRAM/ADVERTISEMENT BCD |
| ⋮ | |
| TAG 2 | PROGRAM/ADVERTISEMENT ABC |
| TAG 2 | PROGRAM/ADVERTISEMENT EFG |
| TAG 2 | PROGRAM/ADVERTISEMENT FGH |
| ⋮ | |
| TAG M | PROGRAM/ADVERTISEMENT XYZ |

610 — TAG FIELD column
620 — VIDEO PROGRAM/ADVERTISEMENT FIELD column

NOTIFICATION FOR INTERACTIVE CONTENT

BACKGROUND

Television content is ever-changing. It seems like new channels or television programs, as well as numerous Video On Demand (VoD) titles, get introduced every day. As a result, it is becoming increasingly difficult to wade through all of the content on television.

The amount of content available on television increases even more with the introduction of interactive content. Interactive television is still in its early stages and as a result, conventions for creating the best user experience for television viewers have not been established. It is often difficult for a viewer to determine when interactive content is available.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may provide a notification for interactive content so that television viewers know ahead of time (e.g., before having to click a button on a remote control) if there is interactive content available for a particular television program. If there are multiple types of interactive content, the notification may also identify which type of interactive content is available.

Figure 1:
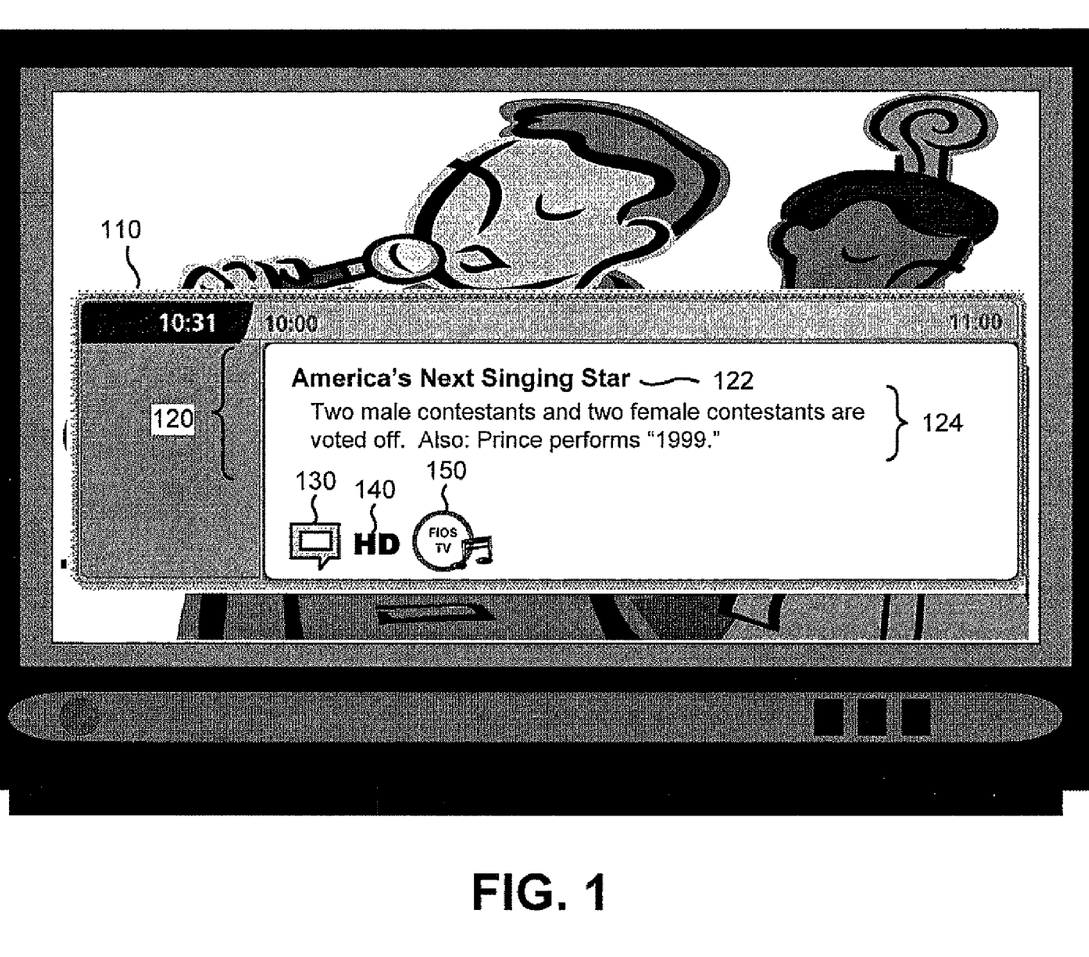
FIG. 1 is a diagram that illustrates an overview of an implementation described herein.

FIG. 1 is a diagram that illustrates an overview of an implementation described herein. As shown in FIG. 1, a program status bar 110 may be presented in certain situations based on user activity. For example, program status bar 110 may be presented when the user turns on his/her television, when the user changes channels, or when the user pushes a particular button on his/her remote control. Program status bar 110 may include information 120 regarding the program currently provided on the television (e.g., a program name 122 and/or a short description 124 of the program).

As shown in FIG. 1, program status bar 110 may also include one or more icons: an icon 130 to identify that closed captioning is available for the program; an icon 140 to indicate that the program is available in high definition (HD); and an icon 150 to indicate that interactive content is available for the program. Interactive content icon 150 may not only indicate that interactive content is available, but it may also indicate what type of interactive content is available. As shown in FIG. 1, for example, interactive content icon 150 may indicate that music interactive content is available. For example, a music track or clip may be available for playing or purchase.

In the description to follow, a notification for interactive content will be described in terms of interactive content relating to television programs. It should be understood, however, that the description equally applies to other types of interactive content, such as interactive content relating to music programs or on demand services (e.g., video, games, or music). As used herein, the term "program" is intended to be broadly interpreted to include any form of content for which interactive content may be provided. The term "icon," as used herein, is intended to be broadly interpreted to include any visual object that may be presented via a display screen.

Other terms that are used herein include "program guide," "program information page," and "program status bar." A "program guide" is intended to be broadly interpreted to include a listing and/or schedule of programs available for viewing. A "program information page" is intended to be broadly interpreted to include information regarding a particular program. A "program status bar" is intended to be broadly interpreted to include information regarding a particular program, which typically includes less information than the program information page.

In the context of interactive content for television programs, implementations described herein may provide notifications, possibly in the form of an interactive content icon, to television program viewers so that these viewers can determine (e.g., before having to click a button on a remote control) if there is interactive content available for particular television programs. If there are multiple types of interactive content available, the notification may also identify which type of interactive content is available.

Interactive content may include content that can be continuously provided or provided when requested. Examples of types of interactive content might include special promotions or discounts, interactive advertisements, sports statistics, or offers of audio or video information for playing or purchase. For example, a football program may include interactive content relating to fantasy football statistics, interactive content that offers an audio clip or track for playing or purchase relating to the halftime show entertainment, and/or interactive content that offers a video clip or file for playing or purchase relating to the football game or a team participating in the football game.

Figure 2:
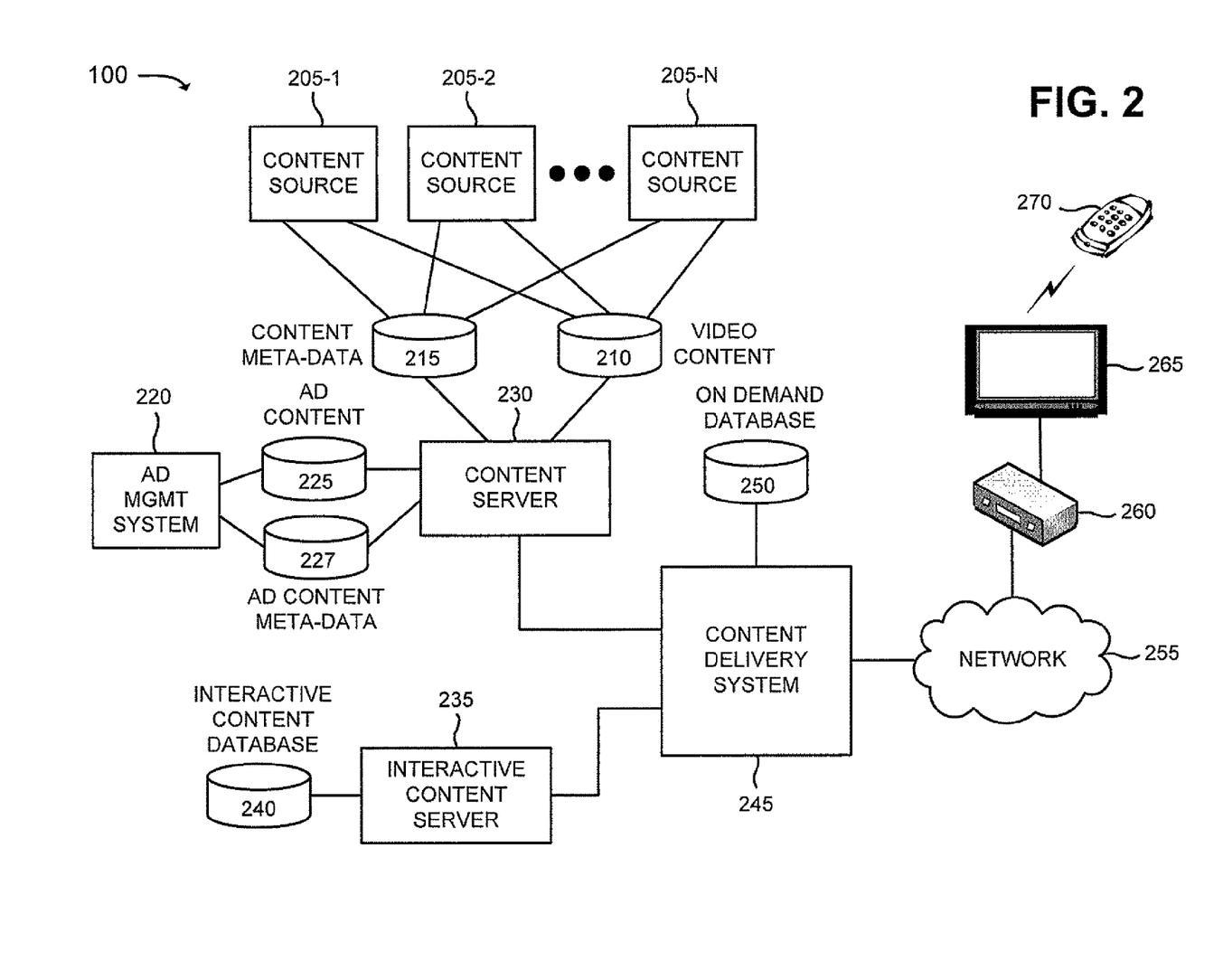
FIG. 2 is an exemplary diagram of a network in which systems and methods described herein may be implemented.

FIG. 2 is an exemplary diagram of a network 200 in which systems and methods described herein may be implemented. Network 200 may include content sources 205-1, 205-2, ..., 205-N (where N≥1) (collectively referred to as "content sources 205"), video content database 210, content meta-data database 215, advertising (ad) management (mgmt) system 220, advertising content database 225, advertising content meta-data database 227, content server 230, interactive content server 235, interactive content database 240, content delivery system 245, on demand content database 250, network 255, video client 260, video display device 265, and remote control 270. In practice, network 200 may include more, fewer, or different devices than are shown in FIG. 2. Also, two or more of these devices may be implemented within a single device, or a single device may be implemented as multiple, distributed devices. Further, while FIG. 2 shows direct connections between the various devices, any of these connections can be indirectly made via a network, such as a local area network, a wide area network (e.g., the Internet), a telephone network (e.g., the Public Switched Telephone Network (PSTN) or a cellular network), or a combination of networks.

Content sources 205 may include any type or form of content. For example, content sources 205 may include free television broadcasts (e.g., local broadcasts, such as NBC, CBS, ABC, and Fox), for-pay television broadcasts (e.g., TNT, ESPN, HBO, Cinemax, CNN, etc.), and/or web-based content (e.g., streaming content from web sites). Video content database 210 may store video signals representing the video programs provided by various ones of content sources 205. Content meta-data database 215 may store meta-data associated with the video programs provided by various ones of content sources 205. The meta-data might include program descriptions, program line-ups and/or schedules, or other information associated with the video programs in video content database 210.

Advertising management system 220 may control what advertising content is presented in connection with the video programs in video content database 210. Advertising management system 220 may store advertising content in advertising content database 225. The advertising content may include advertisements (e.g., commercials that are inserted within a program signal, long form advertisements that are not inserted within the program signal, text or graphics that are overlaid on a program or an advertisement, advertisements that are presented alongside the program signal, and/or interactive advertisements) and/or links to advertisements that may be served via a network, such as the Internet. Advertising content meta-data database 227 may store meta-data associated with the advertisements in advertising content database 225. The meta-data might include scheduling information, rating information, category information, length of advertisement, classification information, expiration date of the advertisement, or other information that advertising management system 220 and/or content server 230 may find useful in serving and/or targeting the advertising content.

Content server 230 may include a device that is capable of controlling the serving of video programs from video content database 210, the program meta-data from content meta-data database 215, and/or the advertising content from advertising content database 225. In one implementation, content server 230 may include a content mixing engine to select information, such as video programs, program meta-data, advertising content, and/or advertisement meta-data, and mix the information together. Content server 230 may optionally also perform transcoding of the mixed information.

Interactive content server 235 may include a device that is capable of managing the serving of interactive content in association with a video program. Interactive content server 235 may retrieve interactive content, as necessary, from interactive content database 240. Interactive content database 240 may store the interactive content and may store an association between the interactive content and the video programs and/or advertisements with which the interactive content corresponds. Interactive content database 240 may also store interactive content icons, possibly associated with different types of interactive content, and an association between the interactive content icons and the video programs and/or advertisements with which the interactive content icons correspond.

Content delivery system 245 may include a device that is capable of delivering information to a customer's equipment (e.g., a customer's video client 260). Content delivery system 245 may include a service adaptor component and a media relay component. The service adaptor component may control what information (e.g., what video programs and/or advertisements) to provide to which customers based, for example, on customer subscriptions and/or profiles. The media relay component may control the transmission of the information to the customers. The media relay component may perform encoding and/or encryption functions.

Content delivery system 245 may also include one or more on demand components that may provide on demand services (e.g., music, video, and/or games on demand). On demand database 250 may store on demand content that may be provided by content delivery system 245.

Network 255 may include a video signaling and distribution network to distribute the information from content delivery system 245. Network 255 may take the form of a wide area network, a local area network, an intranet, a telephone network (e.g., the Public Switched Telephone Network or a cellular network), or a combination of networks.

Video client 260 may include a device capable of receiving and processing the information from content delivery system 245 for display on video display device 265. In one implementation, video client 260 may take the form of a set top box. In another implementation, video client 260 may include a computer device, a cable card, a stationary communication device (e.g., a telephone), a portable communication device (e.g., a mobile telephone or a personal digital assistant (PDA)), or the like. Video client 260 may perform decoding and/or decryption functions on information received from content delivery system 245.

Video display device 265 may include a device capable of receiving and reproducing video and audio signals. In one implementation, video display device 265 may take the form of a television. In another implementation, video display device 265 may include a computer monitor, a display of a stationary communication device (e.g., a telephone) or a portable communication device (e.g., a mobile telephone or a PDA), or the like.

Remote control 270 may include a device capable of remotely controlling the operation of video client 260 and/or video display device 265. Remote control 270 may transmit infrared signals, or another type of signals, to a reader associated with video client 260 and/or video display device 265.

Figure 3:
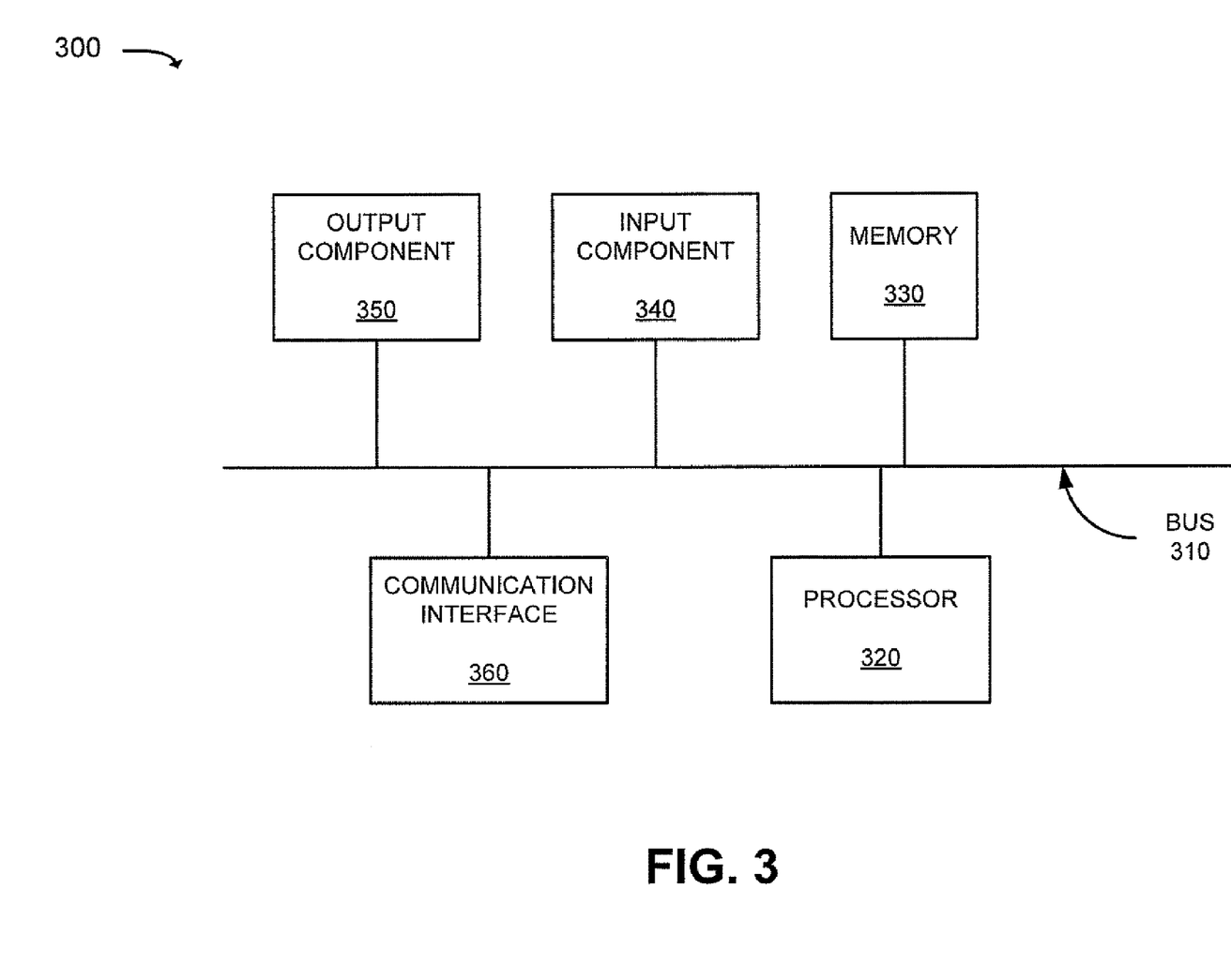
FIG. 3 is an exemplary diagram of components of a device of FIG. 2.

FIG. 3 is an exemplary diagram of components of a device 300 that may correspond to advertising management system 220, content server 230, interactive content server 235, content delivery system 245, video client 260, video display device 265, and/or remote control 270. In another implementation, device 300 may include more, fewer, or different components.

Device 300 may include a bus 310, a processor 320, a memory 330, an input component 340, an output component 350, and a communication interface 360. Bus 310 may include a path that permits communication among the components of device 300.

Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits an operator to input information to device 300, such as a keyboard, a keypad, a button, a switch, etc. Output component 350 may include a mechanism that outputs information to the operator, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, or the like.

As will be described in detail below, device 300 may perform certain operations relating to interactive content. Device 300 may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Figure 4:
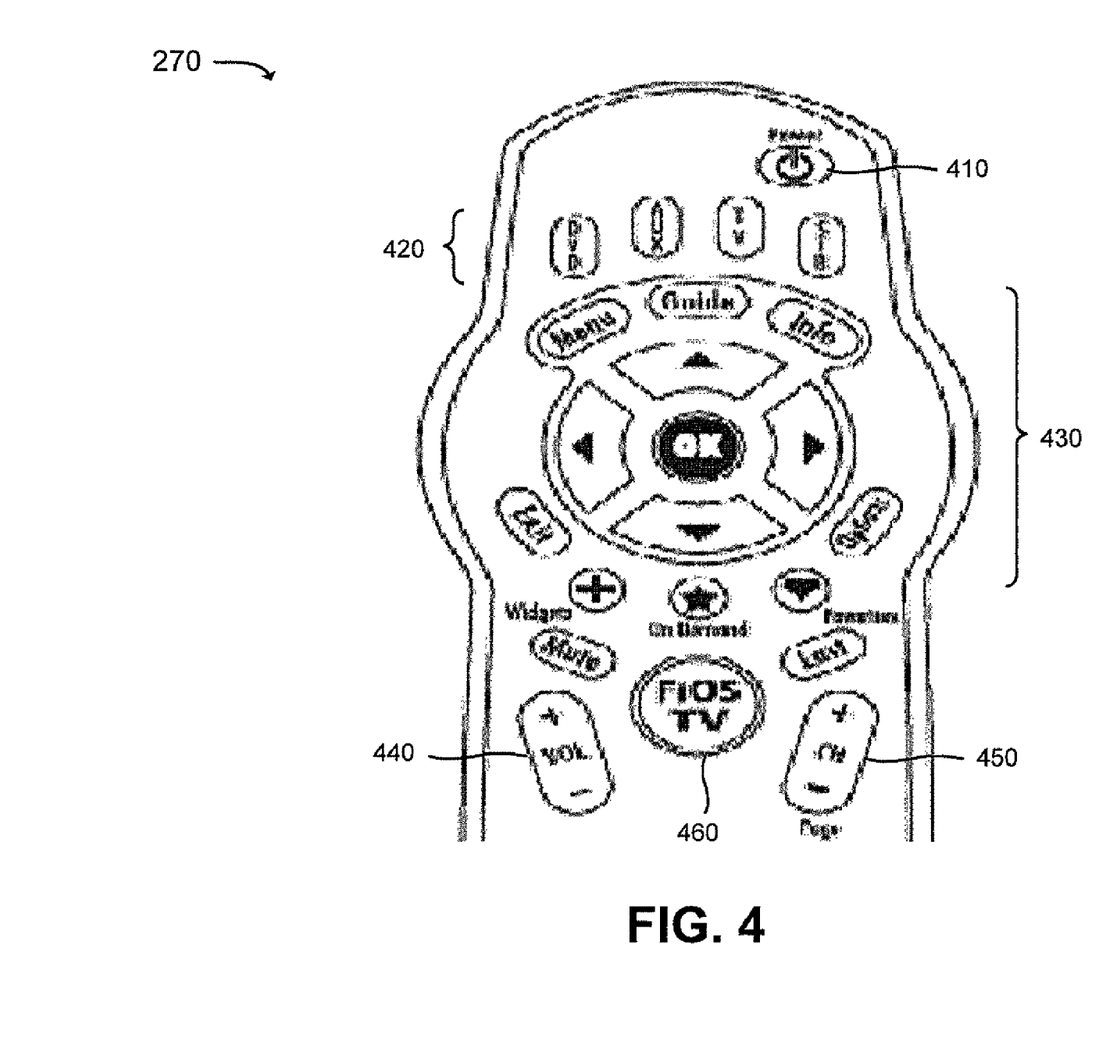
FIG. 4 is an exemplary diagram of a portion of the remote control of FIG. 2.

FIG. 4 is an exemplary diagram of a portion of remote control 270. As shown in FIG. 4, remote control 270 may include buttons 410-460 that may cause video client 260 and/or video display device 265 to perform various functions. For example, remote control 270 may include a power button 410, device selection buttons 420, program guide buttons 430, volume button 440, channel button 450, and an interactive content button 460.

Power button 410 may cause a controlled device (e.g., video client 260, video display device 265, or another device, such as a receiver, a VCR, or a DVD player) to power up or down. Device selection buttons 420 may identify a device to be controlled, such as video client 260, video display device 265, or another device, such as a receiver, a VCR, or a DVD player.

Program guide buttons 430 may include buttons for displaying and interacting with an on-screen program guide. The program guide may include information regarding available video programs, such as program descriptions, program listings, program schedules, etc. Volume button 440 may cause a controlled device to change its volume setting. Channel button 450 may cause a controlled device to change its channel setting. Interactive content button 460 may cause interactive content to be provided in association with a video program offering interactive content.

Figure 5:
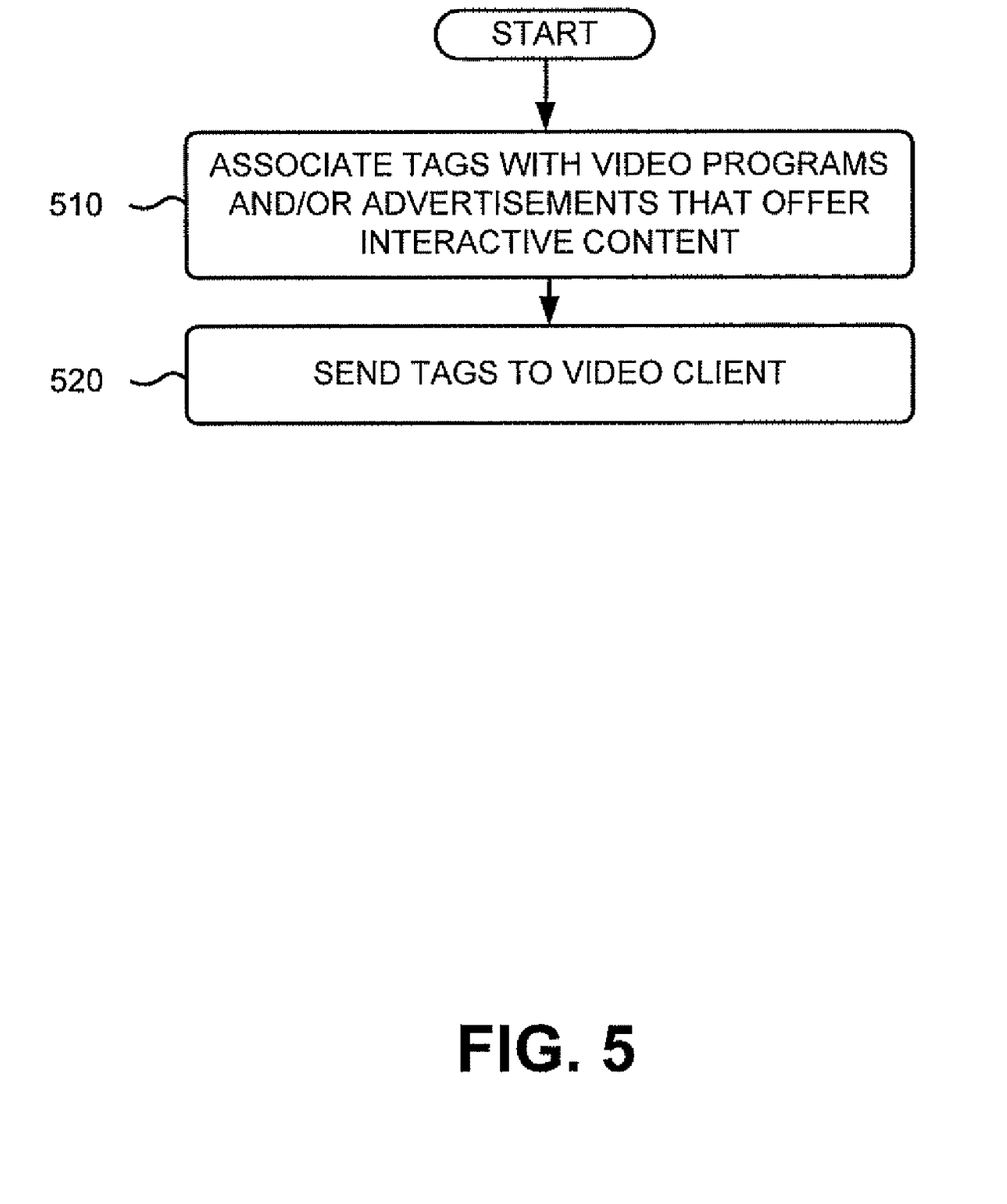
FIG. 5 is a flowchart of an exemplary process for associating tags with video programs offering interactive content.

FIG. 5 is a flowchart of an exemplary process for associating tags with video programs offering interactive content. In one implementation, one or more of the process blocks of FIG. 5 may be performed by one or more software and/or hardware components within interactive content server 235.

The process may include associating tags with video programs and/or advertisements that offer interactive content (block 510). In one implementation, the association between tags and video programs and/or advertisements may be stored in a table.

Figure 6:
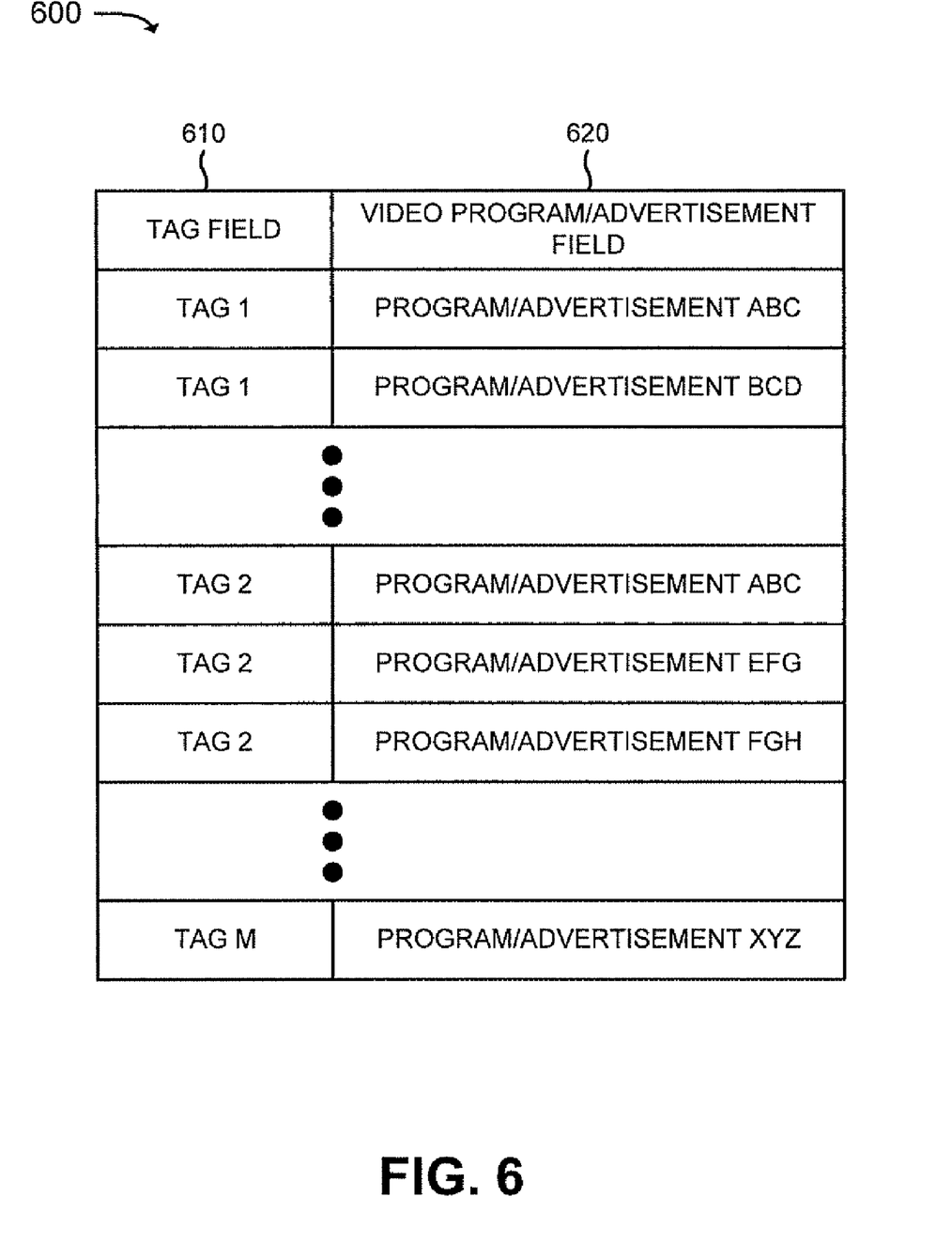
FIG. 6 is a diagram of a table that may include associations between tags and video programs offering interactive content.

FIG. 6 is a diagram of a table 600 that may include associations between tags and video programs and/or advertisements (also referred to as "program/advertisement" or "programs/advertisements") offering interactive content. Table 600 may include a tag field 610 and a video program/advertisement field 620. In another implementation, table 600 may include more or different fields. Also, while table 600 is sorted by the information in tag field 610, table 600 may alternatively be sorted by the information in video program/advertisement field 620.

Tag field 610 may include information (i.e., a "tag") that identifies a particular type of interactive content and/or a particular type of interactive content icon. Video program/advertisement field 620 may include information that identifies a particular video program and/or advertisement. For each of the different types of interactive content, there may be a corresponding type of interactive content icon that identifies the particular type of interactive content. There may be different types of interactive content available for video programs/advertisements (e.g., tag 1, tag 2, . . . , tag M in table 600). There may also be multiple types of interactive content available for a particular video program/advertisement (e.g., tags 1 and 2 are associated with program/advertisement ABC in table 600).

In another implementation, the association between tags and video programs and/or advertisements may be made in a different manner, such as by storing tag information in the meta-data associated with a video program or advertisement. In this case, the meta-data for a video program ("The Today Show") may take the form of:

```
<Metadata>
  <Asset>
    <Title Value="The Today Show" />
    <Rating Value="TV-PG" />
    <Description Value="Skater Kristi Yamaguchi; Mary J. Blige
      performs; actor Will Smith; holiday cooking and desserts; gifts for
      travelers." />
    <ClosedCaptioning Value="Yes" />
    <HD Value="Yes" />
    <Station Value="NBC" />
    <InteractiveContentIcon>
      <EnhancedTVIcon Value="Yes" />
      <CommerceIcon Value="Yes" />
      <MusicIcon Value="Yes" />
    </InteractiveContentIcon>
  </Asset>
</Metadata>;
``` where "EnhancedTVIcon" may refer to whether special promotions or discounts are available, "CommerceIcon" may refer to whether there is an item or service for purchase, and "MusicIcon" may refer to whether a music track or clip is available for playing or purchase.

Returning to FIG. 5, the tags may be sent to a video client, such as video client 260 (block 520). In one implementation, the tags may be sent through an IP-based transfer protocol or via the same architecture used to send program guide data feeds. In another implementation, the tags may be combined or concurrently transmitted with the video program/advertisement feed or the program/advertisement meta-data feed. It may be beneficial to integrate a tag with a program guide, a program information page, a program status bar, a video program signal, and/or advertisement information prior to sending the tag to video client 260.

Figure 7:
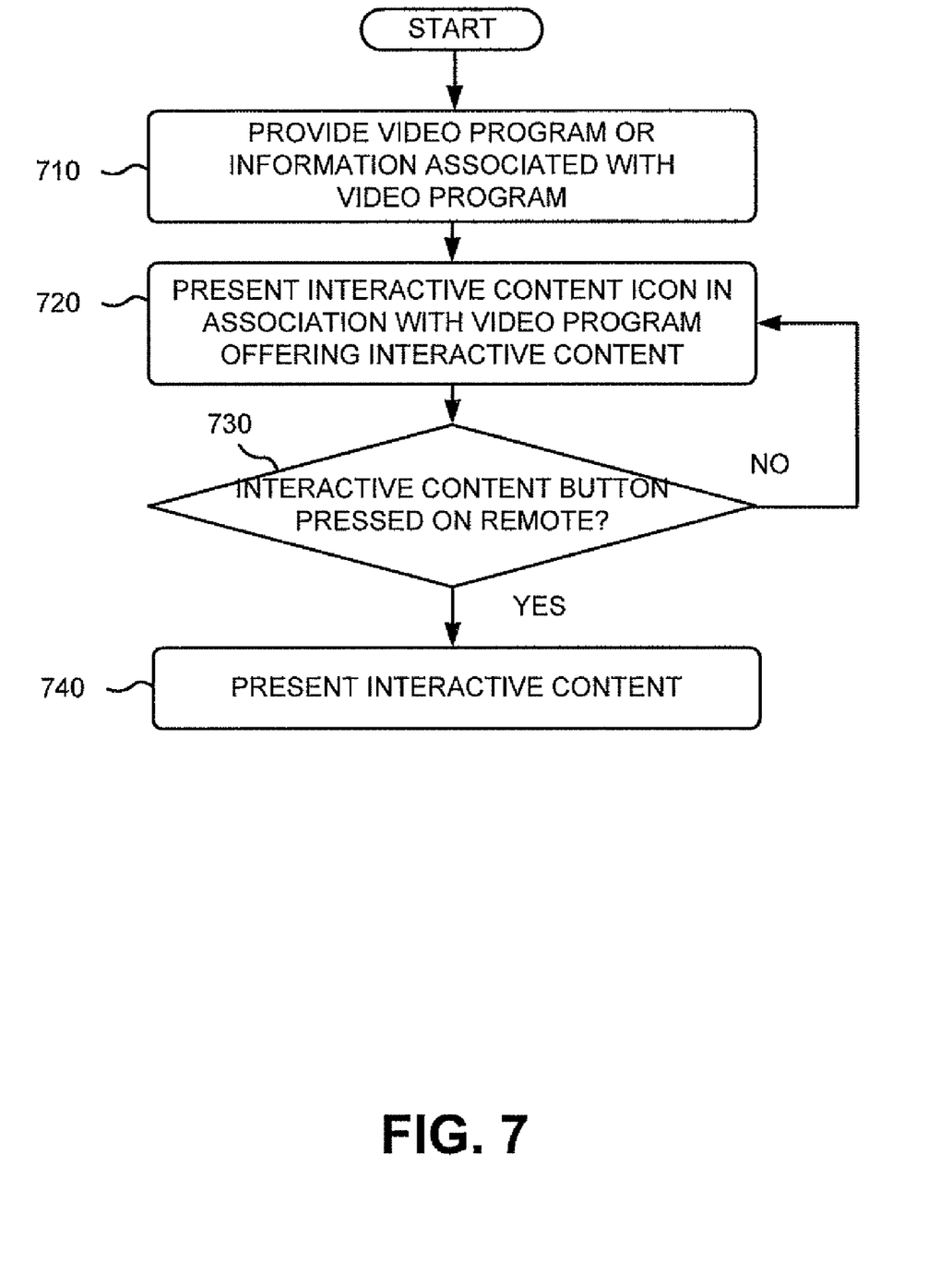
FIG. 7 is a flowchart of an exemplary process for providing interactive content.

FIG. 7 is a flowchart of an exemplary process for providing interactive content. Similar blocks may be performed when providing interactive content relating to an advertisement. In one implementation, one or more of the process blocks of FIG. 7 may be performed by one or more software and/or hardware components within video client 260.

The process may include providing a video program or information associated with a video program (block 710). For example, if a user powers up video client 260 and/or video display device 265 by, for example, pressing power button 410 on remote control 270, video client 260 may present a video program and/or information associated with the video program (e.g., a program status bar) corresponding to the currently tuned-to channel on video display device 265. If the user activates a program information page or a program status bar by, for example, pressing an appropriate button on remote control 270, video client 260 may present the program information page or the program status bar on video display device 265. If the user activates a program guide by, for example, pressing one or more program guide buttons 430 on remote control 270, video client 260 may present information associated with one or more video programs (e.g., via the program guide) on video display device 265. If the user changes the channel by, for example, pressing channel button 450 on remote control 270, video client 260 may present a video program and/or information associated with the video program (e.g., a program status bar) corresponding to the new channel on video display device 265. In other implementations, other steps may be taken to cause a video program or information associated with the video program to be presented on display device 265.

An interactive content icon may be presented in association with a video program offering interactive content (block 720). The interactive content icon may identify, to the user, that interactive content is available for the video program. The interactive content icon may also identify the type of interactive content that is available for the video program. The interactive content icon may be presented in a manner such that the user can quickly and easily identify (e.g., at a glance) that interactive content, or a specific type of interactive content, is available.

The particular interactive content icon that is presented may be determined based on a received tag that has previously been associated with the video program. For example, video client 265 may receive a tag from content delivery system 245 and may identify the appropriate interactive content icon based on the tag. Alternatively, video client 265 may receive the appropriate interactive content icon from content delivery system 245.

Figure 8:
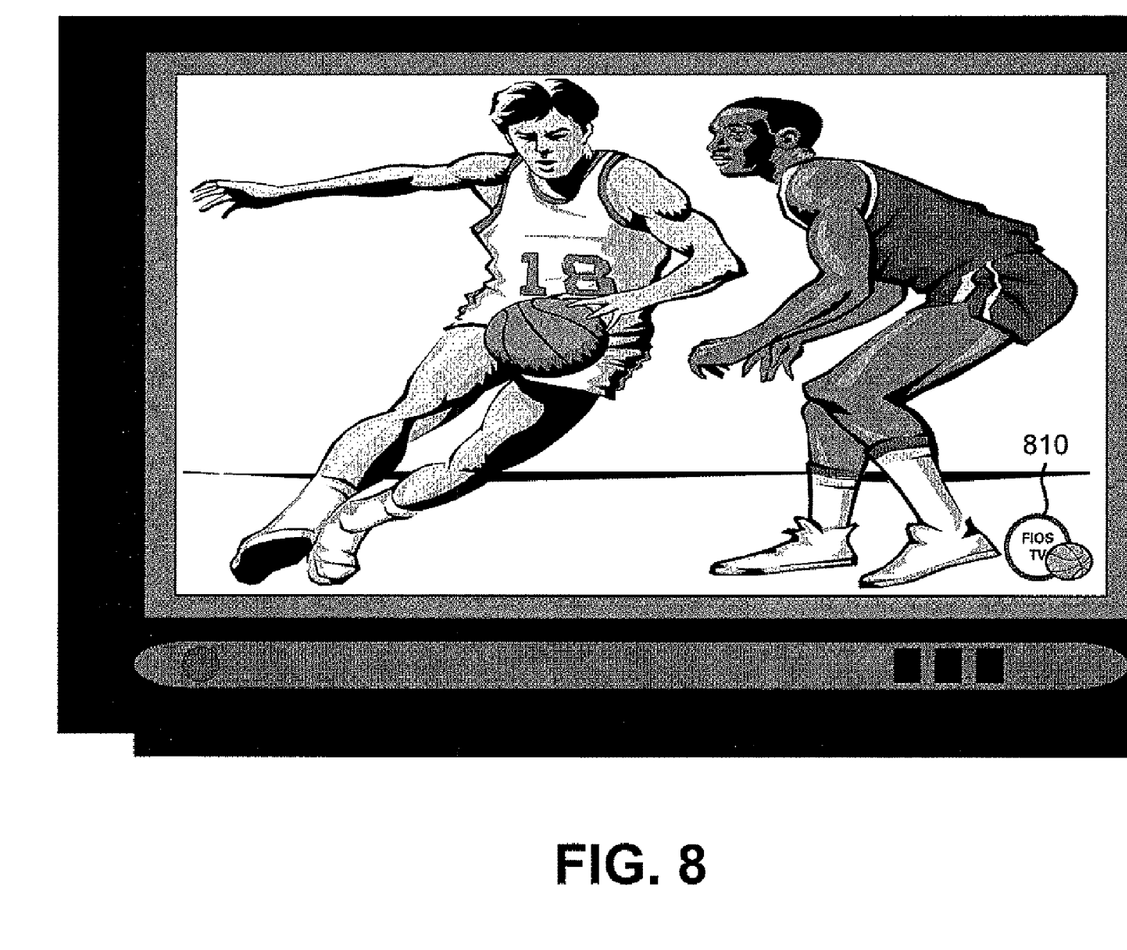
FIGS. 8-10 are exemplary diagrams of ways that an interactive content icon can be presented.
Figure 9:
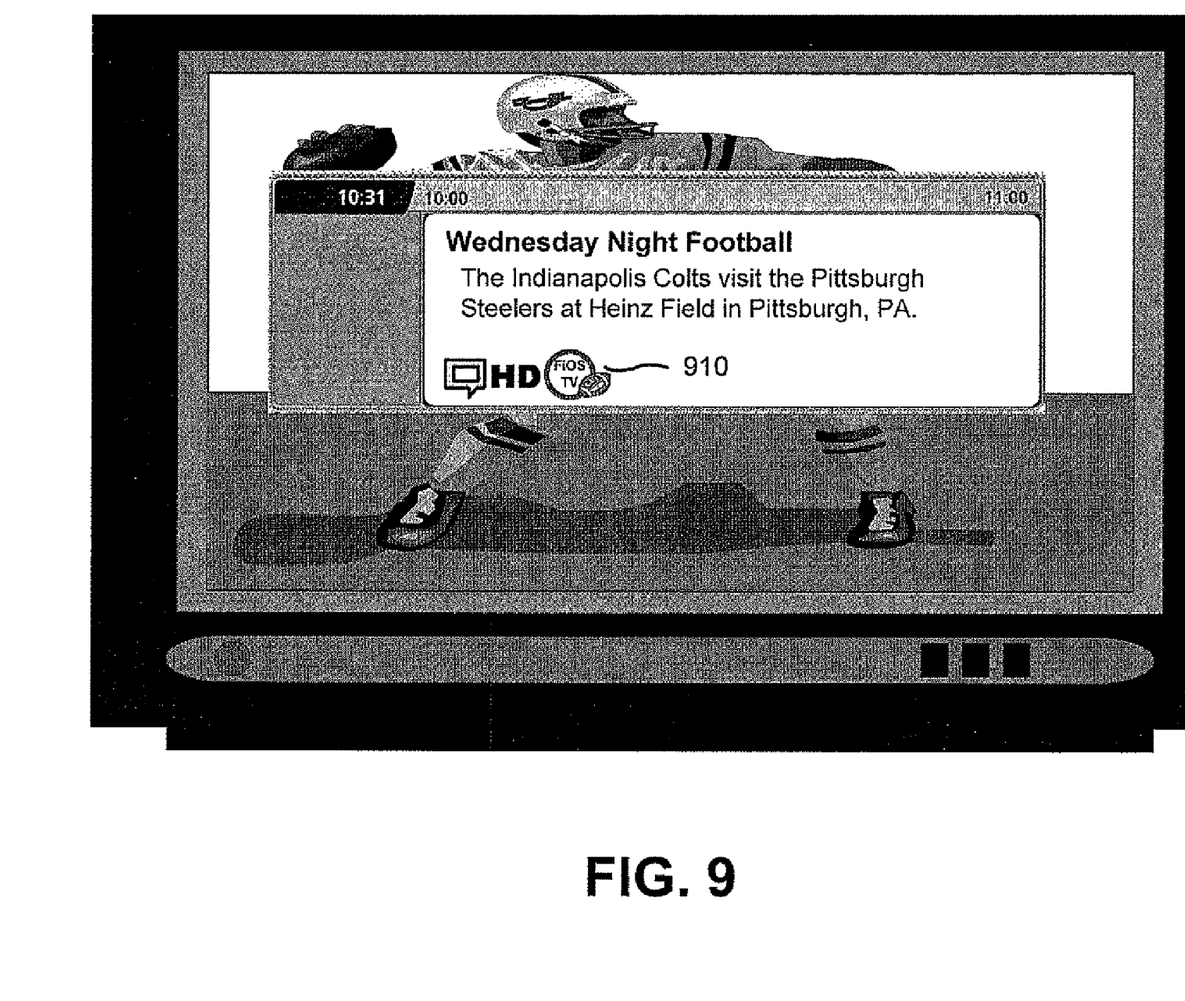
Figure 10:
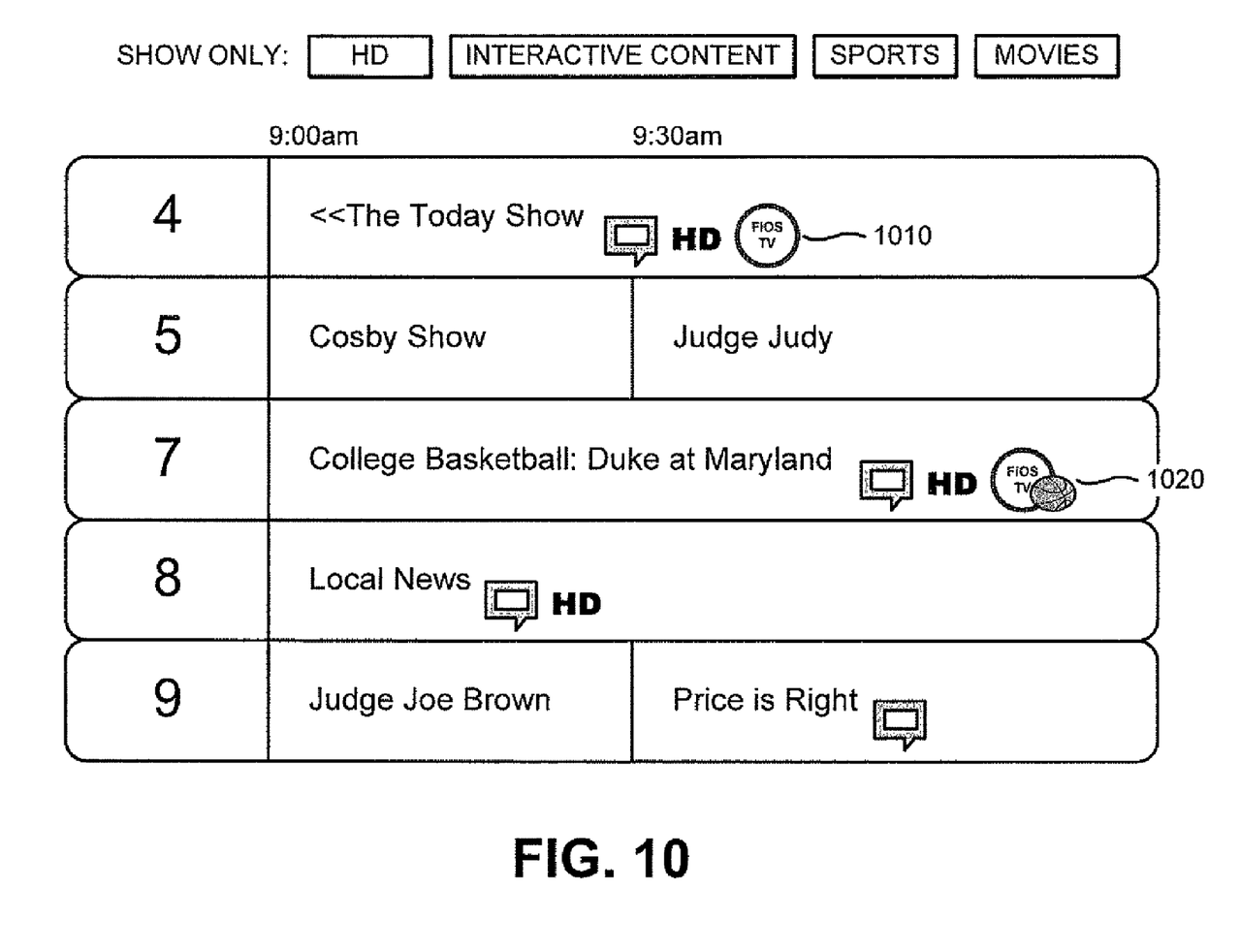

The interactive content icon may be presented on a video program, a program status bar, a program information page, a program guide, or elsewhere in connection with a video program. FIGS. 8-10 are exemplary diagrams of ways that an interactive content icon can be presented. As shown in FIG. 8, an interactive content icon 810 may be overlaid on a video program (e.g., a basketball game). Techniques exist for overlaying information on a video signal. Such a technique may be used to present interactive content icon 810 on the video program. Interactive content icon 810 may indicate that interactive content in the form of basketball statistics is available.

As shown in FIG. 9, an interactive content icon 910 may be presented on a program status bar overlaid on a video program (e.g., a football game). Interactive content icon 910 may be similarly presented on a program information page (not shown). Interactive content icon 910 may indicate that interactive content in the form of football statistics is available.

As shown in FIG. 10, an interactive content icon 1010 or 1020 may be presented on a program guide. The program guide may include a listing and/or schedule of video programs. The video programs for which interactive content is available may include an interactive content icon, such as interactive content icons 1010 and 1020.

The interactive content icons (or more appropriately the tags associated with the interactive content icons) may be used to filter the video programs listed in the program guide. For example, the program guide may offer a number of ways that the listed programs can be filtered. Examples of ways for filtering the programs listed in the program guide include filtering by high definition (e.g., show only the video programs that are available in high definition), interactive content (e.g., show only the video programs that offer interactive content), sports (e.g., show only the video programs that correspond to a sporting event), or movies (e.g., show only the video programs that correspond to movies). Filtering may also be performed for specific types of interactive content. For example, if a user wanted to identify only those video programs that offer interactive content relating to special promotions or discounts, the user may filter the program guide based on this specific type of interactive content.

Figure 11:
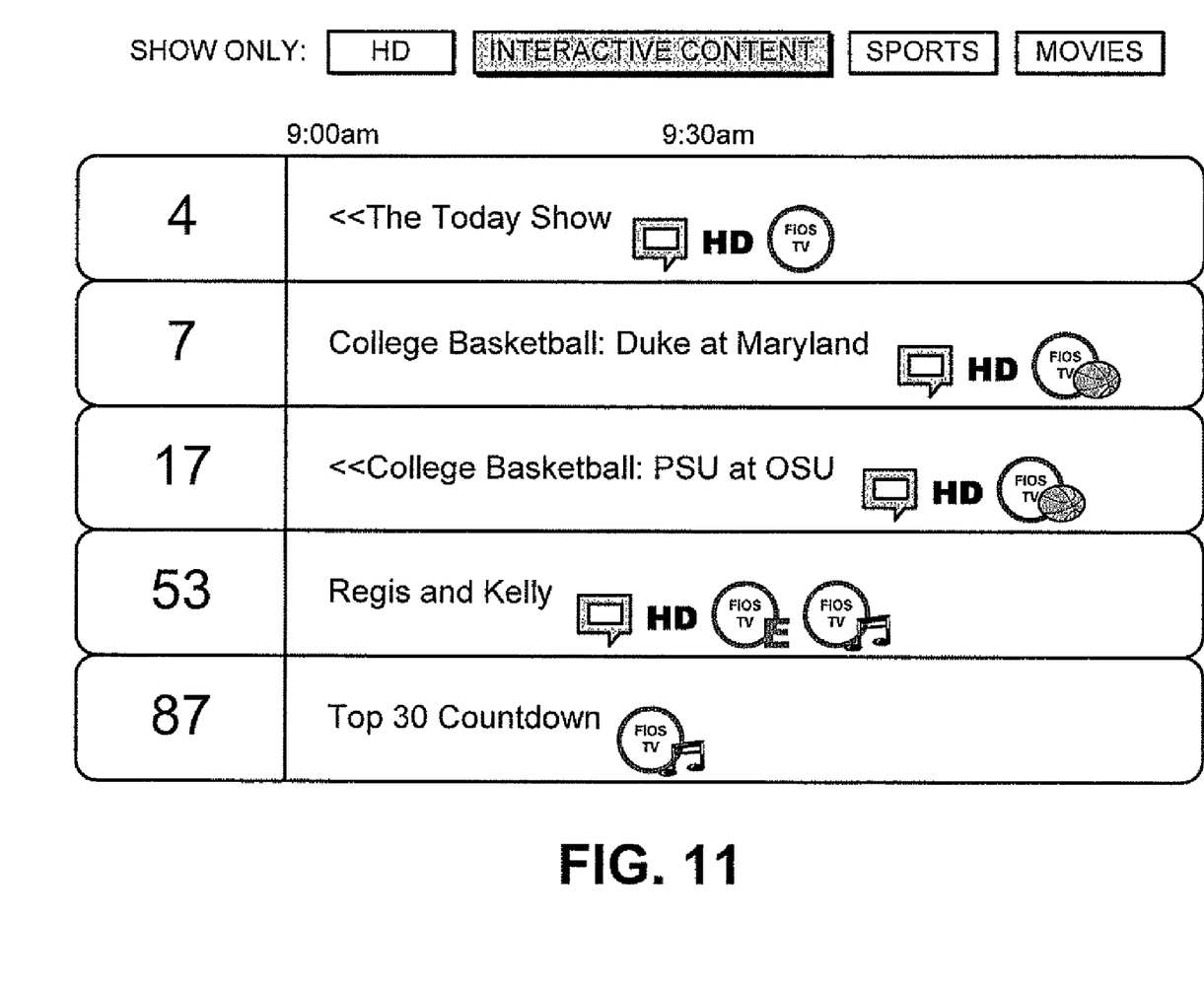
FIG. 11 is an exemplary diagram of the filtering of video programs offering interactive content.

Assume that the user selected to filter the program guide by interactive content. FIG. 11 is an exemplary diagram of the filtering of video programs offering interactive content. As shown in FIG. 11, the program guide may show only those video programs for which interactive content is available. The video program "Regis and Kelly," for example, offers two types of interactive content. The interactive content icon with the "E" may indicate that special promotions or discounts are available. The interactive content icon with the musical note may indicate that a music track or clip may be available for playing or purchase.

Returning to FIG. 7, it may be determined whether the interactive content button 460 (FIG. 4) has been pressed on remote control 270 (block 730). For example, the user, in response to seeing an interactive content icon on video display device 265, may press interactive content button 460 to obtain access to the interactive content. Remote control 270 may send a corresponding signal to video client 260. In one implementation, no interactive content is provided to the user until it is determined that the user has pressed interactive content button 460 (block 730—NO).

Figure 12:
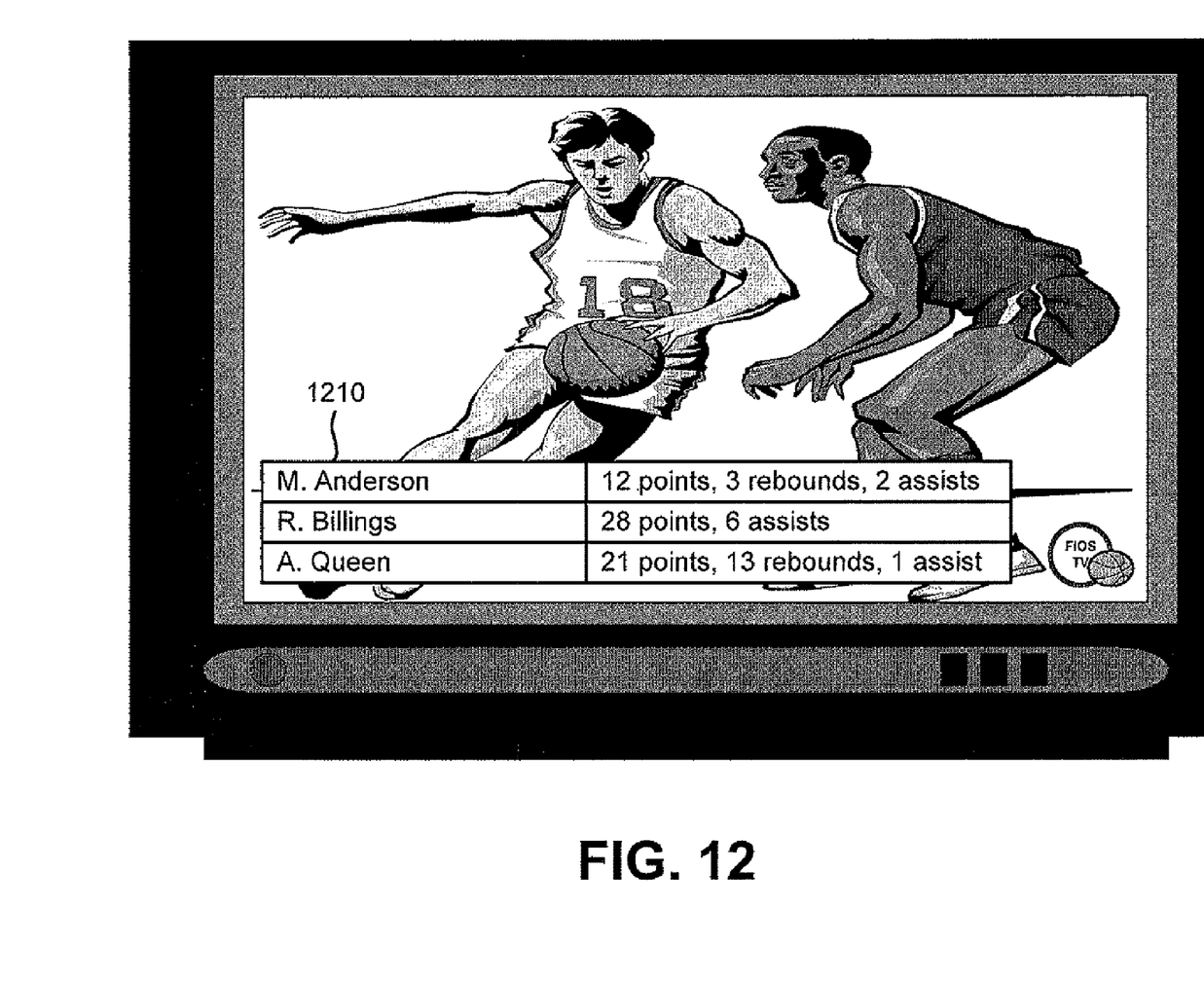
FIGS. 12 and 13 are exemplary diagrams that illustrate the presentation of interactive content.
Figure 13:
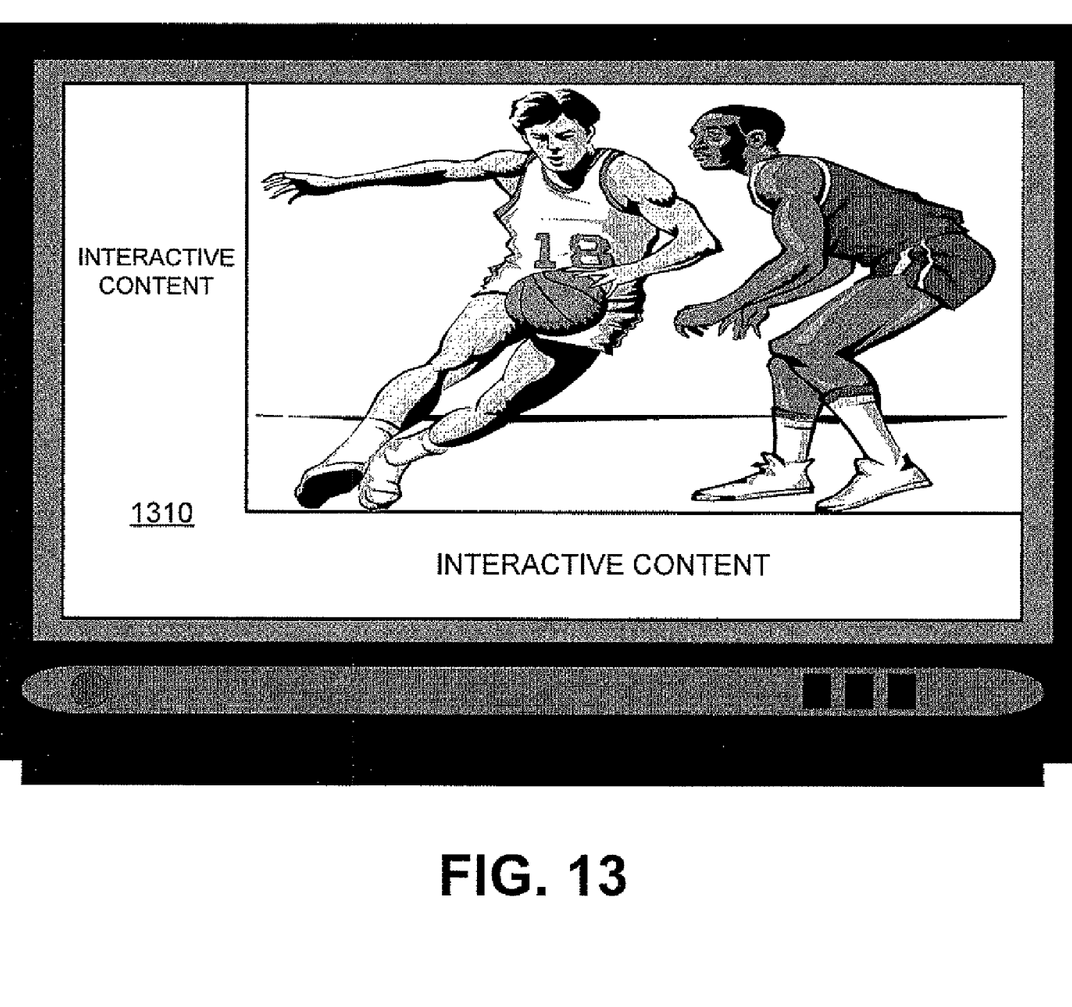

If it is determined that the user has pressed interactive content button 460 (block 730—YES), then the interactive content may be presented (block 740). The interactive content may be presented in one or more of a number of different ways, which may depend on the type of interactive content available. FIGS. 12 and 13 are exemplary diagrams that illustrate the presentation of interactive content. As shown in FIG. 12, interactive content 1210 may be presented as an overlay on the video program currently being presented on video display device 265. As shown in FIG. 13, interactive content 1310 may be presented in a dedicated portion of the screen of video display device 265. For example, the screen of video display device 265 may be partitioned to include a portion for a scaled-down version of the video program and a portion for interactive content 1310. This type of arrangement may be beneficial for certain types of interactive content, such as interactive advertisements, or for all types of interactive content. This type of arrangement may also be beneficial when multiple types of interactive content are available for a particular video program. The interactive content itself, or links to the interactive content, may be presented within the interactive content portion of the screen.

Implementations described herein may provide an interactive content icon on a screen of a video display device. The interactive content icon may inform a user of the availability of interactive content in connection with a video program available via the video display device. The interactive content icon may also inform the user of the type of interactive content that is available.

Interactive content has various uses, such as to provide the user with a richer television experience or to offer products or services for sale that may be of interest to the user. In one implementation, a provider of interactive content (hereinafter "service provider") may offer the user free access to "for-pay" content if the user agrees to be presented with the interactive content. For example, the service provider may permit the user to freely watch pay-per-view movies, play games, obtain video programs via video-on-demand, etc. if the user agrees to be presented with interactive advertisements. The interactive advertisements may be presented to the user via a dedicated portion of the screen of video display device 265, such as shown in FIG. 13.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5 and 7, the order of the blocks may be modified in other implementations. Further, non-dependent blocks may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
   providing, on a video display device, a program guide comprising a plurality of entries, each entry identifying a program of a plurality of programs, at least one entry, of the plurality of entries, including one or more interactive icons visually representing a plurality of types of interactive content with which the at least entry is associated,
   where providing the program guide comprises:
      filtering the plurality of entries based on whether interactive content is available for the programs;
   providing a particular program of the plurality of programs or information associated with the particular program on the video display device, the particular program corresponding to one entry of the at least one entry;
   receiving information associated with interactive content, where the received information associated with the interactive content is indicative of an association between the interactive content and the program, and indicative of a particular type of the plurality of types of interactive content, the interactive content corresponding to the particular type; and
   providing, by a set top box, an interactive content icon on the video display device, based on the received information associated with the interactive content, the interactive content icon indicating that the interactive content is available for the particular program, and visually representing the particular type of the plurality of types of interactive content.

2. The method of claim 1, further comprising:
   receiving selection of an interactive content button on a remote control; and
   providing the interactive content on the video display device.

3. The method of claim 1, where providing the particular program or the information associated with the particular program includes providing one of a program information page or a program status bar.

4. The method of claim 3, where providing the interactive content icon includes providing the interactive content icon on the program information page or the program status bar in connection with the particular program.

5. The method of claim 3, where providing the interactive content icon includes overlaying the interactive content icon on the program.

6. The method of claim 1, where the receiving the information associated with the interactive content comprises:
   receiving a tag that identifies the interactive content and the particular type of the plurality of types of interactive content; and
   determining the interactive content icon based on the received tag.

7. The method of claim 1, further comprising:
   receiving a tag for the particular program, the tag identifying the particular type of the plurality of types of interactive content.

8. The method of claim 7, further comprising:
   determining the interactive content icon based on the received tag.

9. The method of claim 1, where providing the program guide comprises:
   filtering the plurality of entries based on whether a particular type of interactive content is available for the programs.

10. The method of claim 1, further comprising:
    permitting a user free access to a for-pay program when the user agrees to be presented with the interactive content.

11. The method of claim 1, further comprising:
    receiving an indication of a user's desire for the interactive content; and
    partitioning a screen of the video display device into a first portion and a second portion, where the program is provided within the first portion and the interactive content is provided within the second portion.

12. The method of claim 1, further comprising:
    receiving a feed of the particular program, the feed of the particular program comprising the information associated with the interactive content.

13. A system, comprising:
    means for providing, on a video display device, a program guide comprising a plurality of entries, each entry identifying a program of a plurality of programs, at least one entry, of the plurality of entries, including one or more interactive content icons visually representing a plurality of types of interactive content with which the at least one entry is associated;
    means for filtering the plurality of entries, based on one type of the plurality of types of interactive content, to provide a filtered plurality of entries;
    means for providing a particular program, corresponding to one of the filtered plurality of entries, on the video display device, the particular program being associated with the one type of the plurality of types of interactive content;
    means for receiving information associated with interactive content, the received information comprising information associated with the one type of the plurality of types of interactive content, the interactive content corresponding to the one type of the plurality of types of interactive content;

means for identifying an interactive content icon based on the information received by the means for receiving, the identified interactive content icon being indicative of the one type of the plurality of types of interactive content; and means for providing the identified interactive content icon overlaid on the particular program on the video display device, the identified interactive content icon indicating that the one type of interactive content is available for the program.

14. The system of claim 13, where the system includes a mobile device and the video display device includes a display of the mobile device.

15. The system of claim 13, where the system includes a computer device and the video display device includes a monitor associated with the computer device, or where the system includes a set-top box and the video display device includes a television.

16. The system of claim 13, further comprising:

means for receiving other information associated with another, different interactive content for the particular program, the received other information comprising information associated with another, different type of the plurality of types of interactive content; and means for providing another, different interactive content icon overlaid on the program on the video display device, the other, different interactive content icon indicating that the other, different type of interactive content is also available for the program.

17. A system, comprising:

a memory to store data or instructions; and a processor, connected to the memory, to:

provide, on a video display device, a program guide comprising a plurality of entries, each entry identifying a program of a plurality of programs, at least one entry, of the plurality of entries, including one or more interactive content icons visually representing a plurality of types of interactive content with which the at least one entry is associated, filter the plurality of entries based on a type of interactive content of the plurality of types of interactive content, to provide a filtered plurality of entries, each entry of the filtered plurality of entries including an interactive content icon visually representing the type of interactive content of the plurality of types of interactive, provide a particular program, corresponding to one of the filtered plurality of entries, on the video display device, the particular program being associated with the type of interactive content of the plurality of types of interactive content, provide the interactive content icon, visually corresponding to the type of interactive content of the plurality of types of interactive content, with the provided particular program, receive selection of the provided interactive content icon, and provide the type of interactive content of the plurality of types of interactive content while continuing to provide the particular program.

18. The system of claim 17, where, when receiving selection of the interactive content icon, the processor is to:

receive selection of an interactive content button on a remote control.

19. The system of claim 17, where, when providing the interactive content icon, the processor is to provide the interactive content icon on a program information page or a program status bar.

20. The system of claim 17, where when, providing the interactive content icon, the processor is to overlay the interactive content icon on the program.

21. The system of claim 17, where the processor is further to filter the list of the plurality of entries based on whether a particular type of the plurality of types of interactive content is available for the programs.

22. The system of claim 17, where, when providing the type of interactive content of the plurality of types of interactive content, the processor is further to:

partition a screen of the video display device into a first portion and a second portion, where the particular program is provided within the first portion and the type of interactive content of the plurality of types interactive content is provided within the second portion.

23. The system of claim 17, the processor further to:

associate a plurality of tags with one or more of the plurality of programs in a data structure, each tag identifying a particular type of the plurality of types of interactive content or a particular interactive content corresponding to the particular type of interactive content, each entry in the data structure associating a particular tag of the plurality of tags with a particular program of the one or more of the plurality of programs, where, when providing the program guide, the processor is to:

access the data structure, and retrieve, from the data structure, the one or more interactive content icons associated with the at least one entry.

* * * * *